US004001615B2

United States Statutory Invention Registration [19]

[11] Reg. Number: H1615

[45] Published: Dec. 3, 1996

Leupold

[54] MAGNETIC FIELDS FOR CHIRON WIGGLERS

[76] Inventor: Herbert A. Leupold, 26-B Stony Hill Gardens, Eatontown, N.J. 07724

[21] Appl. No.: 399,101

[22] Filed: Feb. 27, 1995

[51] Int. Cl.[6] ..... H01F 7/00

[52] U.S. Cl. ..... 335/210; 335/296; 335/302; 315/5.34; 315/5.35; 372/2; 372/37

[58] Field of Search ..... 335/210, 296, 335/301, 302, 304, 306; 315/5.34, 5.35, 4, 5; 250/396 ML; 372/2, 37

[56] References Cited

U.S. PATENT DOCUMENTS

| | | | |
|---|---|---|---|
| 4,831,351 | 5/1989 | Leupold et al. | 335/306 |
| 4,837,542 | 6/1989 | Leupold | 335/306 |
| 4,876,687 | 10/1989 | Feinstein | 372/2 |

OTHER PUBLICATIONS

R. H. Jackson et al, "The Coaxial Hybrid Iron Wiggler", Nuclear Instrumentation Methods, Physics Research, vol. A(1994).

H. A. Leupold et al, "Augmentation of Field Uniformity and Strength in Spherical and Cylindrical Magnetic Field Sources", Journal of Applied Physics, vol. 70, No. 2 at p. 6621 (1991).

*Primary Examiner*—Bernarr E. Gregory

[57] ABSTRACT

A permanent magnet design including a Chiron Wiggler, which is able to produce a magnetic field to accelerate and focus electrons in a high frequency laser without the use of an externally powered, current driven solenoid.

17 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MAGNETIC FIELDS FOR CHIRON WIGGLERS

GOVERNMENT INTEREST

The invention described herein may be manufactured, used, and licensed by or for the Government for governmental purposes without the payment to us of any royalty thereon.

FIELD OF THE INVENTION

This invention relates generally to magnet designs and more particularly to a permanent magnet design which includes a Chiron Wiggler, for producing a magnetic field capable of operating an electronic device without the use of an external, current driven power source.

BACKGROUND OF THE INVENTION

Magnetic fields are commonly used in the operation of electronic devices, for example, to accelerate and focus electrons in a free electron laser. Such magnetic fields are generated by large mass, current driven systems typically comprised of a solenoid, an external power source and a means for cooling the coils of the solenoid. The disadvantage of such conventional systems, however, is that they are large, expensive and use lots of energy.

The foregoing disadvantages are apparent when conventional electromagnetic apparatus are used to operate a free electron laser. A free electron laser typically has a passageway, often an excavated cylindrical space, through which an electron beam can pass. This passageway can be comprised of hard ferromagnetic material, i.e. magnets, or it can be an iron Chiron Wiggler. Chiron Wigglers are well known in the art. See R. H. Jackson et al., *The Coaxial Hybrid Iron Wiggler,* Nuclear Instrumentation Methods, Physics Research, Vol. A (1994). An externally mounted solenoid would be used to create an axial magnetic field along the length of the passageway. This axial field would then saturate the material comprising the passageway, i.e. iron, thereby inducing a transverse magnetic field that alternates in direction with displacement along the length of the passageway. This transverse field would accelerate and cause the electrons to oscillate circumferentially as they pass longitudinally along the passageway.

Accelerated electrons are known as wigglers. Wigglers radiate energy, the frequency of which depends on the strength and periodicity of the magnetic field. However, the radiation produced by an electron beam which oscillates in an alternating field is of a wave length commensurate with the period of the magnetic field, so that for short wavelengths it becomes difficult to space magnets of sufficient thinness to operate and attain sufficient field strength to accelerate the electrons. To some extent this "tyranny of size" can be overcome by use of relativistic electrons which "see" a magnet structure that shrinks with increasing electron energy. While such an arrangement works, it requires massive equipment to generate the high voltage needed to impart to the electrons enough energy to make them relativistic thereby frustrating the goals of compactness and lightness. The present invention addresses this problem of unattainably thin magnets by use of a permanent magnet structure which includes a Chiron Wiggler, to simultaneously generate sufficient field strength and sufficiently short periods.

It is, therefore, an object of the present invention to replace the actuating solenoids of conventional electromagnetic systems with a compact, light weight permanent magnet structure which includes a Chiron Wiggler, to provide the desired magnetic field, thereby eliminating dependence on electric currents and their power supplies.

SUMMARY OF THE INVENTION

A permanent magnet structure which includes a Chiron Wiggler, for producing a magnetic field without the use of an externally powered, current driven solenoid to accelerate and focus electrons in a free electron laser.

DETAILED DESCRIPTION OF THE DRAWINGS

Figure 1:
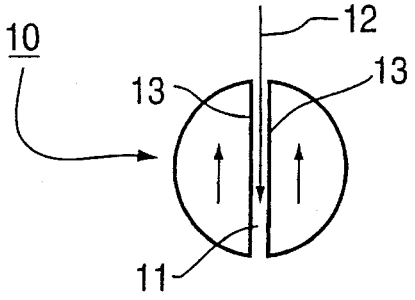
FIG. 1 shows an exemplary embodiment of the permanent magnet structure according to this invention.
Figure 2:
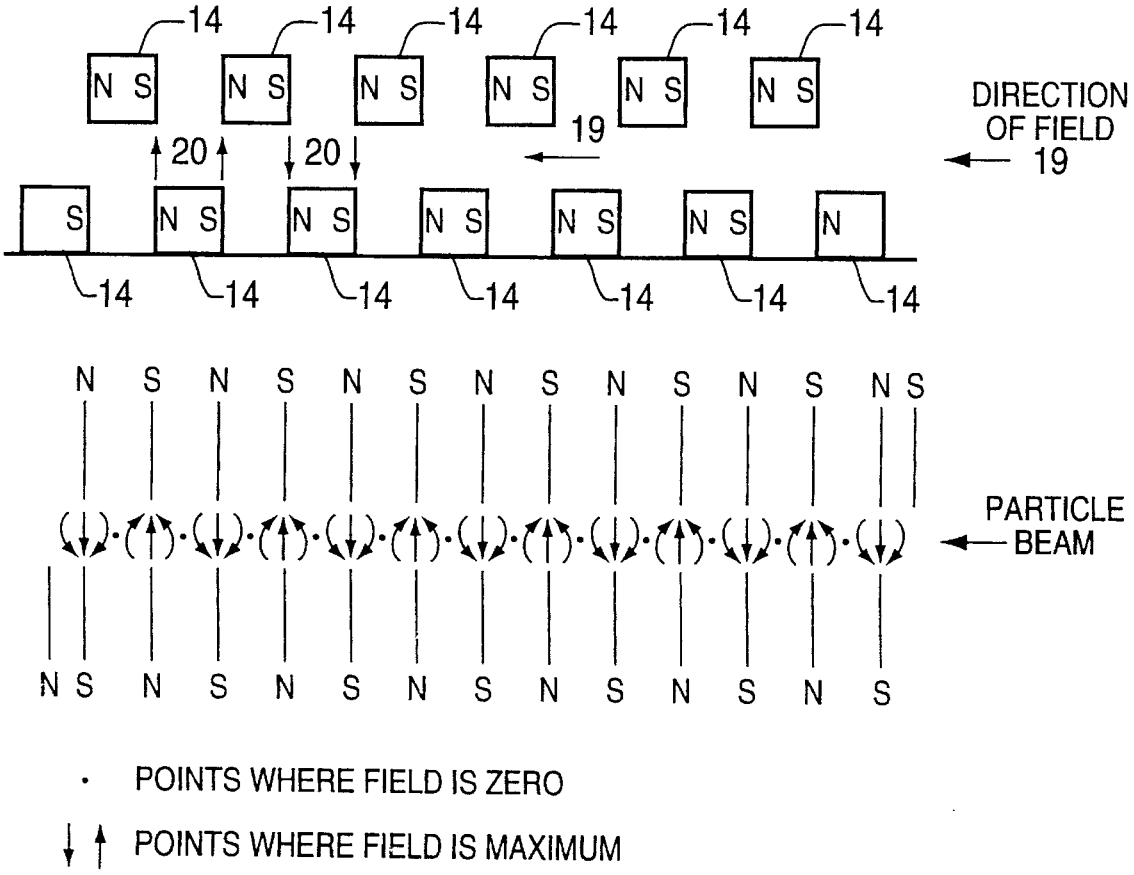
FIG. 2 shows the Chiron Wiggler included in the permanent magnet structure according to this invention.

Referring to FIG. 1 there is shown a cross section of the permanent magnet structure 10 according to this invention. Permanent magnet structure 10 is spherical and has tunnel 11 drilled through it along its magnetic axis 12. In FIG. 1 the large arrow shows the magnetic field direction in tunnel 11 while the small arrows show the direction of the magnetization of permanent magnet 10. Tunnel 11 contains Chiron Wiggler 13 (hereinafter "wiggler"), shown in FIG. 2, along the axis of which charged particles travel. FIG. 2 shows a cross section of wiggler 13 which is comprised of two series of iron elements 14 which are displaced a half-period with respect to one another along tunnel 11.

Figure 3:
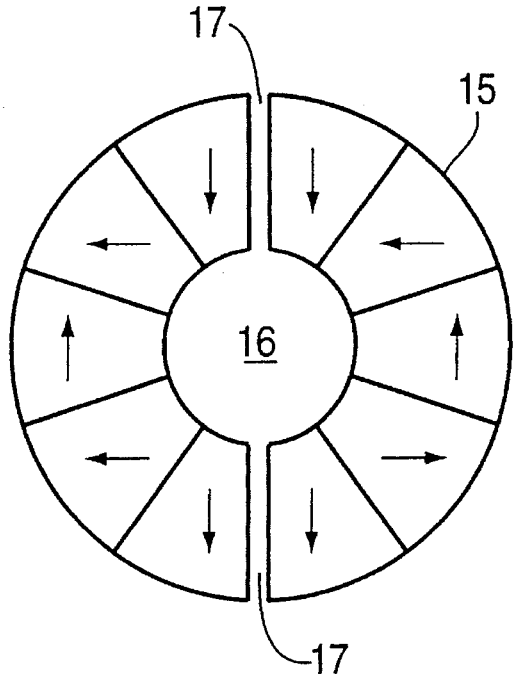
FIG. 3 shows a magic sphere with which the permanent magnet structure according to this invention is used.

FIG. 3 shows magic sphere 15. Magic spheres are well-known in the art. See H. A. Leupold et al., *Augmentation of Field Uniformity and Strength in Spherical and Cylindrical Magnetic Field Sources,* Journal of Applied Physics, Vol. 70, No. 2 at p. 6621 (1991). Magic sphere 15 has a central cavity 16 and tunnel 17 which passes through sphere 15 and its cavity 16. The structure of wiggler 13 is placed in tunnel 11 parallel to the axis of sphere 15, where the field generated by permanent magnet structure 10 saturates the passive or soft material from which wiggler 13 is fabricated. An augmented sphere is obtained by placing permanent magnet structure 10 inside of magic sphere 15. Tunnels 11 and 17 are aligned with one another. A particle source may be included in cavity 16 or may be injected from outside sphere 15 via tunnel 17. In the latter case, the fields both in tunnel 17 and in cavity 16 also serve to focus the beam. As seen in FIG. 2, permanent magnet structure 10 produces an axial magnetic field 19 along the length of access tunnel 11, Field 19 saturates iron elements 14 of wiggler 13 thereby inducing a second magnetic field 20 which alternates in direction along tunnel 11 and which is transverse to both the direction of magnetic field 19 and to tunnel 11.

In conventional systems, axial magnetic field 19, being of sufficient strength to saturate iron elements 14 of wiggler 13, would be applied by an electrical solenoid mounted coaxial and external to wiggler 13. However, using the present invention, field 19 is applied by internally positioned permanent magnet structure 10. At saturation (as seen in FIG.

2), iron elements 14 have north poles on their faces that are away from applied field 19 and south poles on their faces facing field 19. Since inner and outer iron element 14 sequences are displaced by an element thickness with respect to each other, the coplanar forces from the respective inner and outer sequences are of opposite polarity and magnetic flux lines will stream radially across the gap between alternating iron elements 14 to produce transverse field 20 of alternating in-out polarity. Therefore, an annular electron beam traveling in the axial direction along the length of tunnel 11 would be subject to an alternating circumferential acceleration from field 20, causing it to radiate, i.e. swerve back and forth between the positive and negative poles of wiggler 13 and thus wiggle along tunnel 11.

It might seem that a similar result could be obtained if iron elements 14 were replaced by axially oriented permanent magnetic discs of alternating polarity in which case an applied solenoidal field would be unnecessary. Doing so, however, would result in two drawbacks: first, permanent magnets have only about half the saturation magnetization of ferromagnetic alloys and hence supply much smaller fields; and second, permanent magnets are more brittle than and cannot be made thin as easily as iron.

It is the purpose of this invention to replace the actuating solenoid and its external power supply with a permanent magnet structure to provide a continuous magnetic field sufficiently strong to saturate iron elements 14, thereby eliminating dependence on electric currents and their power supplies. In addition, structural mass will also be reduced.

Figure 4:
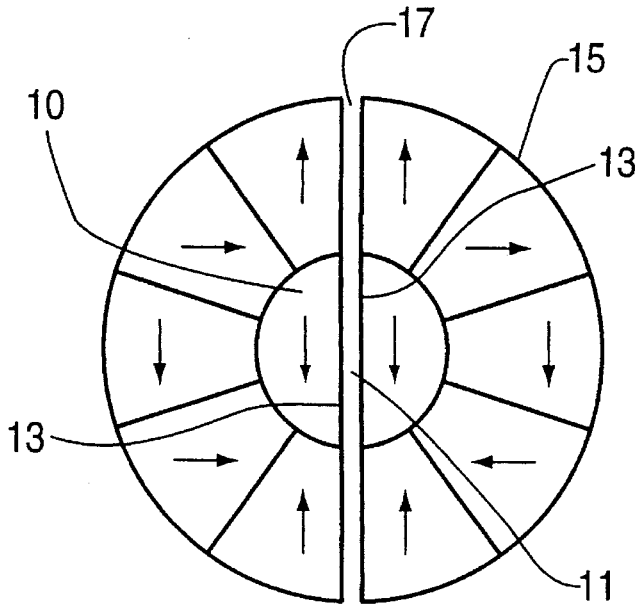
FIG. 4 shows the permanent magnet inside of the magic sphere.

For wiggler 13, applied field 19 will need to be on the order of 5 or 6 kG. If wiggler 13 is to be ten periods long or 1.0 cm, wiggler 13 can be placed in central cavity 16 of magic sphere 15 with (as seen in FIG. 4) or without (as seen in FIG. 3) permanent magnet insert 10 inside, with both permanent magnet structure 10 and magic sphere 15 having a remnance of $B_R$=−12 kG. The former case is usually better since it provides two additive field sources: magic sphere 15 and permanent magnet insert 10; while in the latter case magic sphere 15 acts alone and must be less compact. If the diameter of wiggler 13 is made 0.25 cm, the inner diameter of magic sphere 15 should be 2.5 cm, approximately ten times the diameter of wiggler 13 to ensure a uniform field having less than 1% deviation over the length of wiggler 13.

Permanent magnet structure 10 will provide a longitudinal field of $B_R/3$ equal to approximately 4 kG so that magic sphere 15 would have to provide the extra 2 kG. A sphere having an outer diameter of 2.83 cm and an inner diameter of 2.5 cm and $B_R$=12 kG would provide about 2 kG. The total volume of such a sphere would be 4/3 $(1.41)^3$=11.74 $cm^3$ and it would weigh about (11.74)(8)=0.094 kg where 8 is the density of the permanent magnet material. The decrease in weight due to tunnel 11 accommodating wiggler 13 is not significant. To produce a field of 6 kG electrically would require a current of l=(10/4)(6000)=4,777 amps/cm in a solenoid about wiggler 13, where the field generated inside of a solenoid per unit length is given by the equation 4 I/10. Since 300 amps/$cm^2$ is about the maximum prudent current density, the current must be carried by a cylindrical shell of 4,777/300=15.9 $cm^2$ per axial cm length which means that the circumferential sphere must have a thickness of 15.9 cm and must be three times that length or 48 cm to avoid end effects. The mass of such a conductor, assuming it were made of copper, would be about $((15.9)^2(48)(8.9))$=339 kg, where 8.9 is the density of copper. This is clearly a far larger mass than that of permanent magnet structure 10:339 kg vs. 0.09 kg.

Wiggler 13 need not be annular. Wiggler 13 could be placed in a rectangular structure in which case the electron wiggle would be planar rather than circumferential. Such a rectangular structure is taught in U.S. Pat. No. 5,347,254, FIG. 3, which is incorporated by reference. It will be understood that the embodiments described herein are merely exemplary and that a person skilled in the art may make many variations and modifications to the described embodiments utilizing functionally equivalent elements to those described. Any variations or modifications to the invention just described are intended to be included within the scope of said invention as defined by the appended claims.

What is claimed is:

1. A device for producing a magnetic field without the use of an externally powered, current driven apparatus, to accelerate electrons, comprising:

a permanent magnet for producing a first magnetic field; and a passageway comprised of a ferromagnetic material, said passageway surrounded by said permanent magnet, wherein said first magnetic field saturates said ferromagnetic material thereby producing a second magnetic field transverse to said passageway, said second magnetic field accelerating electrons traveling along said passageway.

2. The device according to claim 1, wherein said second magnetic field is used to focus an electron beam in a high frequency free electron laser.

3. The device according to claim 1, wherein said permanent magnet is sphere shaped.

4. The device according to claim 1, wherein said passageway is a Chiron Wiggler.

5. The device according to claim 1, wherein said permanent magnet is made of a rare earth metal.

6. The device according to claim 1, wherein said ferromagnetic material is iron.

7. The device according to claim 1, wherein said first magnetic field is continuously provided by said permanent magnet.

8. A device for producing a magnetic field without the use of an externally powered, current driven apparatus, to accelerate and focus an electron beam emitted from a free electron laser, comprising:

a permanent magnet for producing a first magnetic field; and a passageway comprised of a ferromagnetic material, said passageway surrounded by said permanent magnet, wherein said first magnetic field saturates said ferromagnetic material thereby producing a second magnetic field transverse to said passageway, said second magnetic field accelerating electrons traveling along said passageway.

9. The device according to claim 8, wherein said permanent magnet is sphere shaped.

10. The device according to claim 8, wherein said passageway is a Chiron Wiggler.

11. The device according to claim 8, wherein said permanent magnet is made of a rare earth metal.

12. The device according to claim 8, wherein said ferromagnetic material is iron.

13. The device according to claim 8, wherein said first magnetic field is continuously provided by said permanent magnet.

14. A device for producing a magnetic field without the use of an externally powered, current driven solenoid, to accelerate and focus an electron beam emitted from a free electron laser, comprising:

a permanent magnet for producing a first magnetic field; and a Chiron Wiggler having iron elements, said Chiron Wiggler passing through said permanent magnet, wherein said first magnetic field saturates said iron elements of said Chiron Wiggler thereby producing a second magnetic field transverse to said Chiron Wiggler, said second magnetic field accelerating said electron beam traveling along said Chiron Wiggler.

15. The device according to claim 14, wherein said permanent magnet is sphere shaped.

16. The device according to claim 14, wherein said permanent magnet is made of a rare earth metal.

17. The device according to claim 14, wherein said first magnetic field is continuously provided by said permanent magnet.

* * * * *